Figure 1:
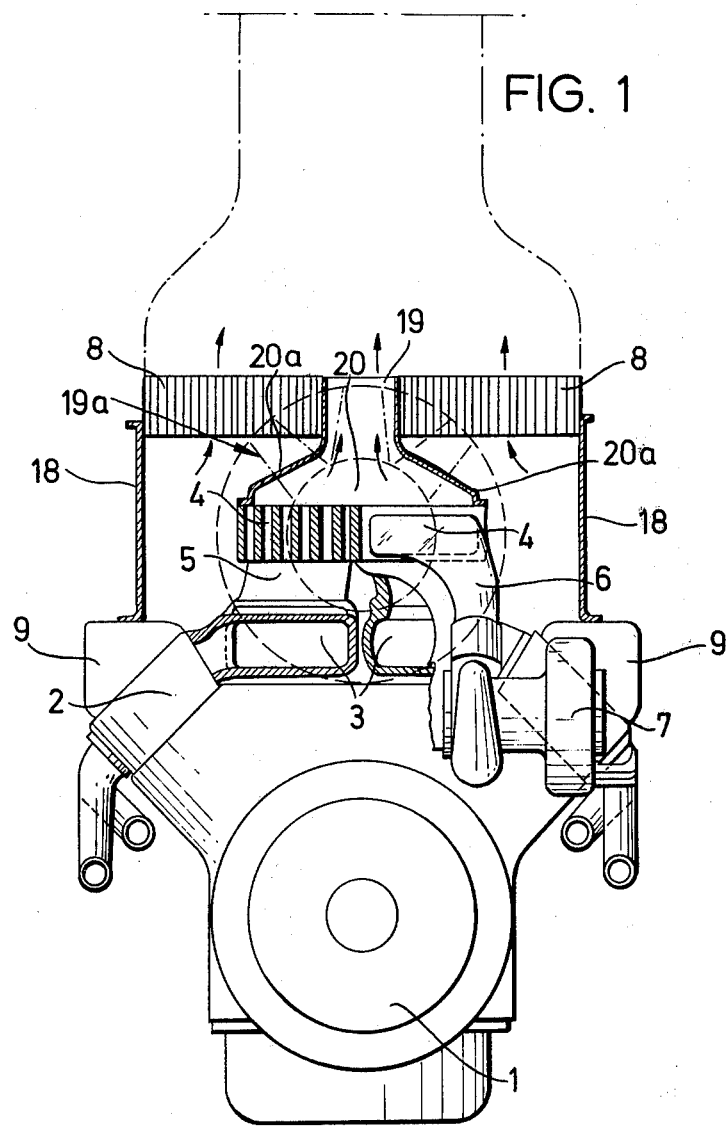

United States Patent [19]
Mettig et al.

[11] 4,075,991
[45] Feb. 28, 1978

[54] SUPERCHARGED WATER COOLED INTERNAL COMBUSTION ENGINE

[75] Inventors: Hermann Mettig, Rodenkirchen; Bernhard Medenus, Bensberg-Lustheide, both of Germany

[73] Assignee: Klöckner-Humboldt-Deutz Aktiengesellschaft, Cologne, Germany

[21] Appl. No.: 690,247

[22] Filed: May 26, 1976

Related U.S. Application Data
[62] Division of Ser. No. 501,214, Aug. 28, 1974, Pat. No. 3,976,041.

[30] Foreign Application Priority Data
Aug. 28, 1973 Germany ............................. 2343300

[51] Int. Cl.² ............................................. F02B 29/04
[52] U.S. Cl. ............................... 123/119 CD; 60/599; 123/41.31
[58] Field of Search ............. 123/41.31, 119 CD, 599

[56] References Cited
U.S. PATENT DOCUMENTS
| | | | |
|---|---|---|---|
| 2,171,817 | 9/1939 | Wagner et al. | 123/41.31 |
| 2,321,097 | 6/1943 | Mills | 123/41.31 |
| 3,027,706 | 4/1962 | Sprick | 60/599 |
| 3,439,657 | 4/1969 | Gratzmuller | 60/599 |

FOREIGN PATENT DOCUMENTS
| | | | |
|---|---|---|---|
| 603,148 | 3/1960 | Italy | 123/119 CD |
| 877,557 | 9/1961 | United Kingdom | 123/119 CD |

Primary Examiner—Charles J. Myhre
Assistant Examiner—David D. Reynolds
Attorney, Agent, or Firm—Walter Becker

[57] ABSTRACT

A water cooled internal combustion engine with a cooling blower arranged at one end face of the engine and with at least one water cooler which is acted upon by the cooling blower and extends alongside the engine. The internal combustion engine is supercharged and equipped with a supercharger air cooler arranged below the water cooler and parallel to the central axis of the engine. The cooling air delivered by the cooling blower passes through the supercharger air cooler in a direction perpendicularly with regard to the central axis of the engine. The supercharger air cooler has a gap of its own for the discharged air which has an exit parallel to the discharged air of the water cooler.

3 Claims, 6 Drawing Figures

SUPERCHARGED WATER COOLED INTERNAL COMBUSTION ENGINE

This is a division of co-pending application Ser. No. 501,214—Mettig—filed Aug. 28, 1974, now U.S. Pat. No. 3,976,041—Mettig et al issued Aug. 24, 1976 and belonging to the assignee of the present invention.

The present invention relates to a water cooled internal combustion engine with a cooling blower arranged at an end face of the internal combustion engine and with at least one water cooler which is actuated by the cooling blower and which extends alongside the internal combustion engine.

According to German Pat. No. 18 11 710 it is known with water cooled reciprocable piston internal combustion engines to provide a water cooler parallel to the cylinder row while a cooling blower arranged at the end face of the reciprocable piston internal combustion engine provides for a horizontal through-flow of the water cooler. With this type of internal combustion engines, a self intake engine without supercharge is involved and consequently without air cooling of the charge. This patent, however, does not refer to the arrangement of coolers for charging air alone or in combination with water coolers.

It has furthermore become known according to German Offenlegungsschrift No. 17 51 209 with an air cooled reciprocable piston internal combustion engine to provide two charge coolers which extend in a flat form along the cylinder rows and confine a V-shaped space. While this reciprocable piston internal combustion engine has charge coolers, it has no motor-water coolers because an air cooled engine is involved. The difficulties encountered when providing charge air coolers in combination with motor water coolers are therefore not suggested by said German offenlegungsschrift.

It is an object of the present invention to provide a space-saving arrangement of supercharger intercoolers and water coolers with an internal combustion engine, in which these structural elements form a unit with the internal combustion engine while the dimensions of the internal combustion engine are only slightly changed.

Figure 2:
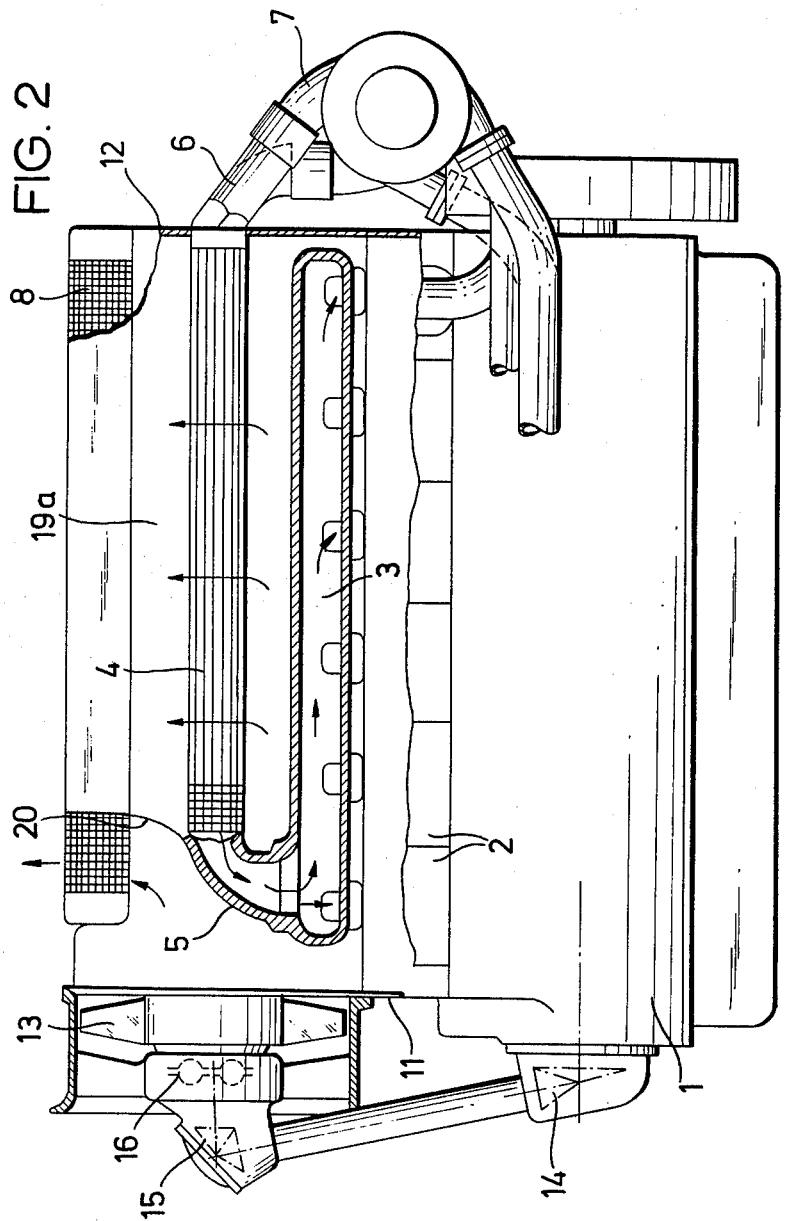

This object and other objects and advantages of the invention will appear more clearly from the following specification in connection with the accompanying drawings, in which:

FIGS. 1 and 2 respectively illustrate in cross section and longitudinal section a water cooled reciprocable piston internal combustion engine with cylinder rows located in V arrangement with regard to each other and provided in conformity with the invention with water coolers and supercharged air coolers or supercharger intercoolers which are passed through vertically.

Figure 3:
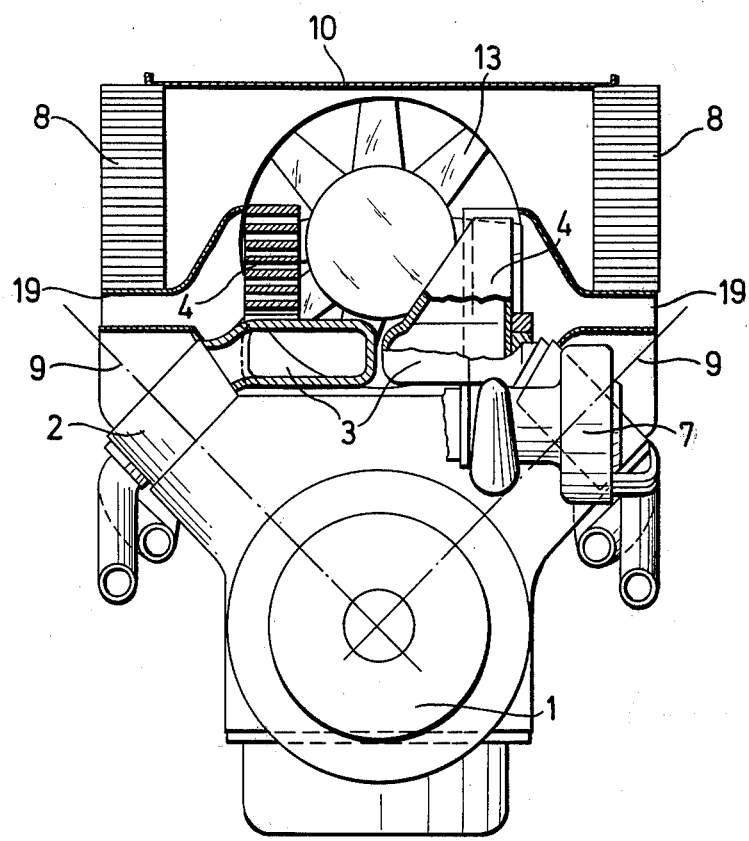
Figure 4:
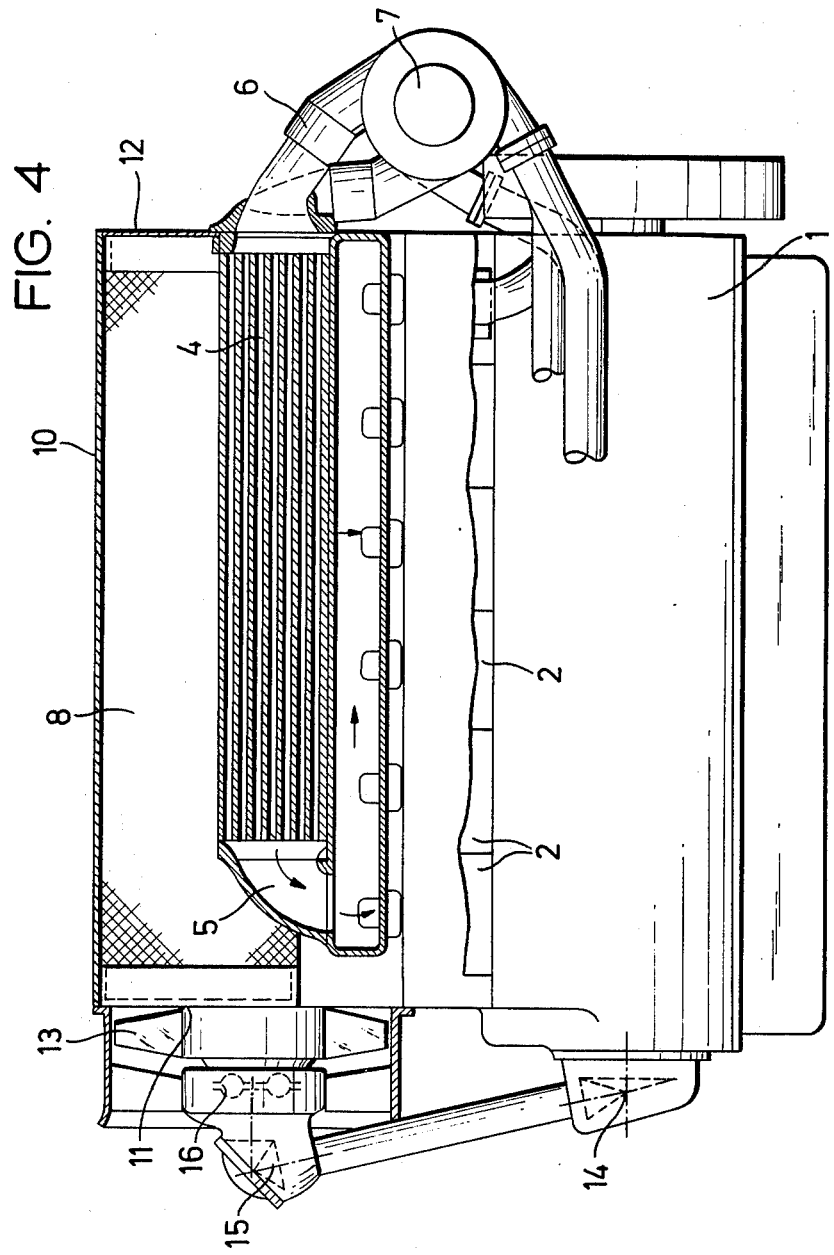
Figure 5:
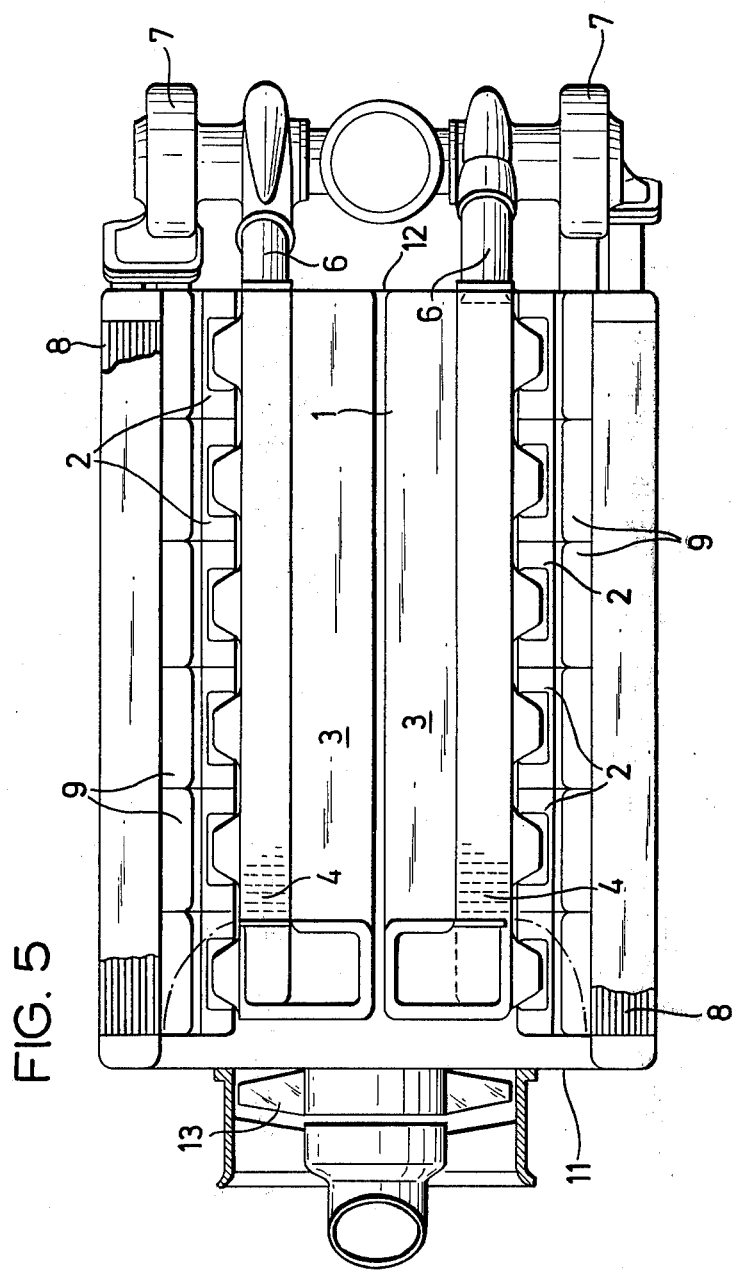

FIGS. 3–5 respectively illustrate partially in cross section and partially in longitudinal section a water cooled reciprocable piston internal combustion engine with cylinder rows in V arrangement and with water coolers and supercharger air coolers passed through horizontally.

Figure 6:
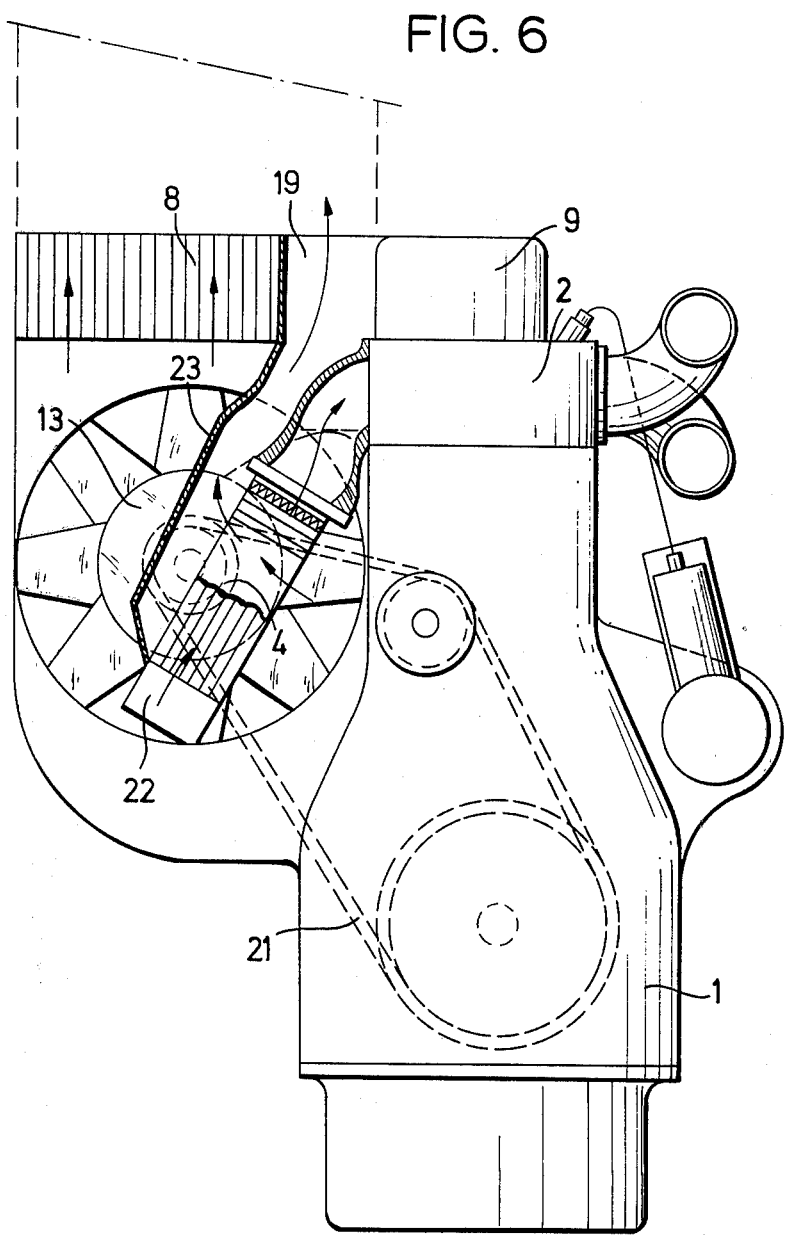

FIG. 6 shows in partial cross section a water cooled reciprocable piston internal combustion engine with in-line cylinders and with built-on water cooler and supercharger air coolers.

The water cooled internal combustion engine according to the present invention includes a cooling blower arranged at one end face of the engine and with at least one water cooler which is actuated by the cooling blower and which extends alongside the internal combustion engine. The present invention is characterized primarily in that the internal combustion engine is equipped with a supercharger air cooler or intercooler and that the supercharger intercooler is arranged below the water cooler parallel to the central axis of the engine. The internal combustion engine according to the present invention is furthermore characterized in that the cooling air delivered by the cooling blower passes through the supercharger air cooler or intercooler in a direction perpendicular to the central axis of the internal combustion engine, while the supercharger air cooler or intercooler has a gap of its own for the air to be discharged, said gap having its mouth parallel to the discharge air of the water cooler.

Due to separate air discharge passages for the water cooler and the supercharger air cooler or intercooler, it is possible for both heat exchangers to obtain a good degree of efficiency. In as much as the discharge air passage of the supercharger air cooler furthermore in the immediate vicinity of the cooling air exit surface of the water cooler ends parallel to said cooling air exit surface, the cooling air can be withdrawn through a common discharge air passage which is of particular importance when the internal combustion engine is built into ships, locomotives, etc.

For a water cooled reciprocable piston internal combustion engine with the cylinder rows in V arrangement in which above each cylinder row there is provided a water cooler, it is furthermore suggested that the water coolers are passed through vertically and that the supercharger intercoolers are arranged between the water coolers and the internal combustion engine and are passed through vertically while the discharge passage of the supercharger intercooler leads into the gap between the water coolers. The main feature of this invention is seen in the closed withdrawal of the cooling air of the motor cooling water together with the cooling air for the supercharged air in a cross section in upward direction outside the motor plan without employing cross sectional surfaces for the cooling air withdrawal. Such an arrangement is advantageous for many instances, for instance when installing the engine in ships, because for the withdrawal of the cooling air no surfaces are employed which go beyond the plane view of the motor. According to a further embodiment of the invention, it is provided that each cylinder row has a supercharger intercooler of its own which is arranged above the intake pipe and parallel to the latter and by means of a deviating elbow is connected with said supercharger intercooler. The charging air which is delivered by a waste gas turbo charger passes through the supercharger intercooler in cross flow to the cooling air and finally passes into the line for the supercharged air from where it passes into the cylinder heads. In this way, the supercharger intercooler can be arranged close to the internal combustion engine. A further modification of the invention with cylinder rows in V arrangement, in which above each cylinder row there is provided a water cooler, provides that the water cooler and the supercharger intercooler are passed through horizontally while the supercharger intercoolers are arranged in the region of the water coolers facing the internal combustion engine and between said water coolers, and while the discharging air passage of each supercharger intercooler leads into a gap between the water cooler and the internal combustion engine. This arrangement is advantageous when lateral discharge possibilities for the discharge air are provided and the vertical space is limited.

Furthermore, for a water cooled reciprocable piston internal combustion engine with in-line arrangement of the cylinders it is suggested that the water cooler is arranged in spaced relationship to the cylinder row so as to be flush with the upper edge of the internal combustion engine and is vertically passed through. The reciprocable piston internal combustion engine of this type is furthermore characterized in that the supercharger intercooler is located approximately along the angle bisecting line between the water cooler and the vertical line of the internal combustion engine and at an incline is passed through outwardly and upwardly while the collecting chamber for the discharge air of the supercharger intercooler leads into a gap between the water cooler and the internal combustion engine.

Referrring now the drawings in detail, FIG. 1 is a view of the output side of the internal combustion engine according to the invention with a cross section through the cooling installation.

FIG. 2 shows a side view with the longitudinal section through the cooling installation. A reciprocable piston internal combustion engine 1 with cylinder heads 2 has for each cylinder row a supercharged air conduit 3 located in the V-space defined between cylinder rows. Connected to each conduit 3 is an air cooled supercharger intercooler 4 which through a deviating elbow 5 communicates with the conduit 3 and through an elbow 6 communicates with the blower of the waste gas turbo charger 7. For each cylinder row there is furthermore provided a water cooler 8 of its own for back cooling the motor water. The water coolers 8 are flat and connected above the cylinder heads 2. Between the water coolers 8 and along the internal combustion engine there is provided a gap 19. Between the water cooler 8 and the cylinder heads 2 there are arranged lateral plates 18 while on the end faces there are provided cover plates 11 and 12. The cooling air is in the illustrated example delivered through a mechanically hydraulically driven cooling air blower 13 which is built into the cover plate 11. This cooling air blower 13 is driven through an angle transmission 14 and 15 and a control clutch 16. Above the supercharger cooler 4 there is provided a discharge air passage 19a which is formed by a partition 20, lateral guiding plates 20a, and the cover plate 12 and leads into the gap 19. The coolers 4 are, as will be evident, acted upon from below by cooling air which passes vertically through the supercharger intercoolers and exits above the same by the cooler water coolers 8. The supercharged air passes through the coolers in longitudinal direction and at the end of the coolers is passed by the elbow 5 to the conduits 3 from where the supercharged air enters cylinder heads 2. The space between the coolers 4 and the engine 1 is confined horizontally merely by the lateral plates 18 and the cover plates 11 and 12 so that the cooling air can freely flow to the coolers 4 and the water coolers 8. The ratio of the through-flow voluminae through the coolers 4 and 8 is determined by the magnitude of the gap 19.

FIG. 3 represents the output side of the reciprocable piston internal combustion engine with a cross section through the motor cooler passed through horizontally. FIG. 4 is a side view with a longitudinal section through the cooling installation, and FIG. 5 shows the top view of the reciprocable piston internal combustion engine.

In this instance, the water coolers 8 are vertically arranged in such a way that the exit surfaces for the cooling air do not project beyond the width of the internal combustion engine. Also the supercharger intercoolers 4 are arranged vertically and substantially parallel to the water cooler 8 and are passed through horizontally. The cooling air of the coolers 4, the interior of which is actuated by cooling air, exits in conformity with the invention below the water cooler 8 and parallel to the cooling air of the water coolers 8. The lower confinement of the exit cross section is formed by the horizontal surfaces of hoods 9 of the cylinder head. The accumulating chamber for the cooling air which chamber is located about the V-space is closed toward the top by a cover plate 10. The cover plate 10 may be connected to the upper longitudinal sides of the water cooler 8. The end faces of the cooling air collecting chamber are closed in conformity with FIGS. 1 and 2 by the plates 11 and 12. The drive of the cooling blower 13 is similar to that of the embodiments shown in FIGS. 1 and 2.

FIG. 6 illustrates an end view of a reciprocable piston internal combustion engine with the cylinder arranged in line with a cross section through the cooling installation. The cooling blower 13 driven by a V-belt 21 acts upon the supercharger intercooler 4 and upon the narrow water cooler 8 which extends over the entire motor length. The supercharged air is in this embodiment delivered by the non-illustrated waste gas turbo loader into the collecting line 22 which extends over the entire length of the cooler 4 and is pressed in a cross flow with regard to the cooling air into the cylinder heads 2. To the lower rim of the cooler 4 which rim is located on the output side, there is connected a discharge air guiding plate 23 which leads to the gap 19 which is confined in this embodiment by the cylinder head hoods 9 and the water cooler 8. The gap 19 for the cooling air leaving the cooler 4 is as narrow as possible and is obtainable by the admissible cooling air resistance so that the entire width of the engine will not be enlarged beyond the diameter of the cooling air blower.

It is, of course, to be understood that the present invention is, by no means, limited to the specific showing in the drawings, but also comprises any modifications within the scope of the appended claims.

We claim:

1. A water cooled internal combustion engine having a central axis which includes: a cooling blower arranged at one end face of said engine, at least one water cooler extending alongside said engine and operatively connected to said cooling blower, a supercharger air cooler arranged underneath said water cooler and in parallel alignment with the central axis of said engine, and means for directing the cooling air delivered by said cooling blower so that said cooling air flows through said supercharger air cooler in a direction perpendicular to the central axis of said engine, said supercharger air cooler itself being provided with a gap forming an exit for the air to be discharged in one common direction from said supercharger air cooler and extending parallel to the path of the air to be discharged from said water cooler, cylinder rows in V-arrangement with one water cooler each over each of said cylinder rows, said water coolers defining a gap therebetween and being arranged for being passed through by air in vertical direction, said supercharger air coolers being arranged between said water coolers and said engine for being passed through by air in vertical direction, said supercharger air coolers also having discharge passage means leading into said gap between said water coolers, supercharged air conveying conduit means respectively associated with said cylinder rows and located therebetween, each cylinder row having a supercharger air cooler of its own arranged parallel to the respective supercharged air conveying conduit means, and deviating elbow means connecting said supercharger air cooler to said supercharged air conveying conduit means.

2. A water cooled internal combustion engine having a central axis which includes: a cooling blower arranged at one end face of said engine, at least one water cooler extending alongside said engine and operatively connected to said cooling blower, a supercharger air cooler arranged underneath said water cooler and in parallel alignment with the central axis of said engine, and means for directing the cooling air delivered by said cooling blower so that said cooling air flows through said supercharger air cooler in a direction perpendicular to the central axis of said engine, said supercharger air cooler itself being provided with a gap forming an exit for the air to be discharged in one common direction from said supercharger air cooler and extending parallel to the path of the air to be discharged from said water cooler, cylinder rows in V-arrangement with one water cooler each over each of said cylinder rows, said water coolers and said supercharger air coolers being arranged to be passed through by air horizontally, said supercharger air coolers being arranged within that region of said water coolers which faces said engine and being located between said water coolers, said water coolers and said engine defining a gap therebetween, and each supercharger air cooler having an air discharge passage leading into said gap between said water coolers and said engine.

3. A water cooled internal combustion engine having a central axis which includes: a cooling blower arranged at one end face of said engine, at least one water cooler extending alongisde said engine and operatively connected to said cooling blower, a supercharger air cooler arranged underneath said water cooler and in parallel alignment with the central axis of said engine, and means for directing the cooling air delivered by said cooling blower so that said cooling air flows through said supercharger air cooler in a direction perpendicular to the central axis of said engine, said supercharger air cooler being provided with a gap forming an exit for the air to be discharged from said supercharger air cooler and extending parallel to the path of the air to be discharged from said water cooler, with a row of cylinders, said water cooler being arranged in spaced relationship to said row of cylinders and substantially in alignment with said engine for being passed through by air in vertical direction, said supercharger air cooler being located along a line bisecting the angle formed by said water cooler and the vertical plane of said engine and being adapted to be passed through by air at in incline toward the outside and toward the top, said water cooler and said engine defining a gap therebetween, and each supercharger air cooler having an air discharge passage leading into said gap between said water cooler and said engine.

* * * * *